No. 751,417. PATENTED FEB. 2, 1904.
F. L. REEVE.
GRAIN SEPARATOR.
APPLICATION FILED JUNE 25, 1903.
NO MODEL.

Witnesses

Inventor
F. L. Reeve,
By
Attorney

No. 751,417. Patented February 2, 1904.

UNITED STATES PATENT OFFICE.

FRANK LANDON REEVE, OF FRAZEE, MINNESOTA, ASSIGNOR OF ONE-HALF TO JOSEPH ANTHONY SCHLEHR AND JOHN HURLEY, OF FRAZEE, MINNESOTA.

GRAIN-SEPARATOR.

SPECIFICATION forming part of Letters Patent No. 751,417, dated February 2, 1904.

Application filed June 25, 1903. Serial No. 163,037. (No model.)

*To all whom it may concern:*

Be it known that I, FRANK LANDON REEVE, a citizen of the United States, residing at Frazee, in the county of Becker and State of Minnesota, have invented certain new and useful Improvements in Grain-Separators; and I do declare the following to be a full, clear, and exact description of the invention, such as will enable others skilled in the art to which it appertains to make and use the same.

This invention relates to improvements in threshing-machines.

In the operation of threshing it is a well-known fact that from four-fifths to nine-tenths of the grain is separated from the straw by the cylinder and concave, but that in machines as ordinarily constructed the grain and straw are thrown together again or intermingled by the direct passage of the same from the cylinder to the straw-rack, the grain being thrown on top of the straw, thus compelling the manufacturers to build their machines of great length and with numerous devices to separate the grain and straw.

The object of this invention is to provide simple and efficient means to separate the straw and chaff from the wheat as these substances leave the cylinder, so that the threshed-out grain will be free to fall into or upon a suitable receiver or conveyer, thus enabling a number of parts to be omitted and the construction of the machine considerably simplified.

Figure 1:
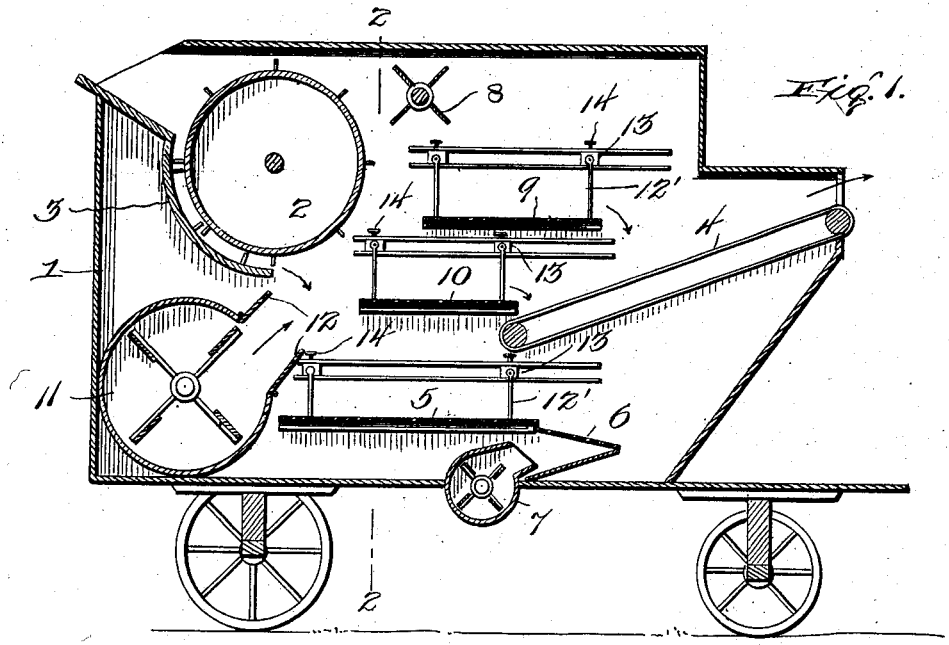
Figure 2:
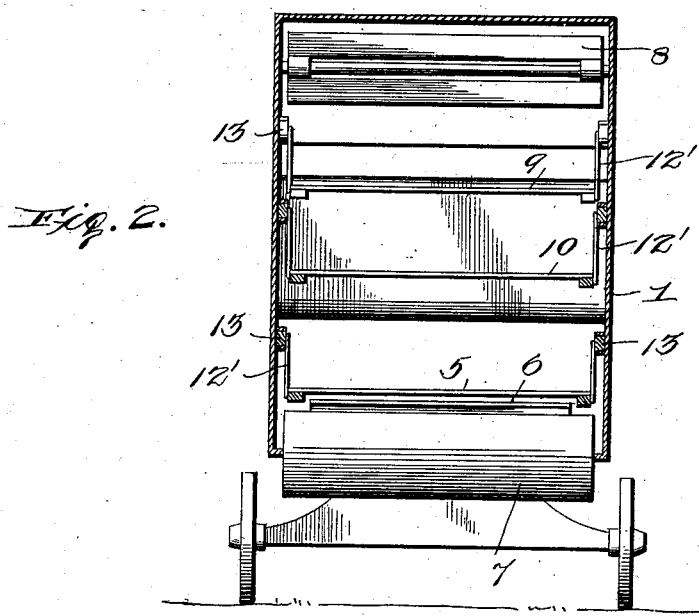

Figure 1 of the drawings represents a longitudinal section of a threshing-machine embodying my invention, and Fig. 2 is a cross-section on line 2 2 of Fig. 1.

Referring to the drawings, 1 represents the frame of the thresher; 2, the cylinder; 3, the concave; 4, an inclined delivery straw-rack or endless straw-conveyer; 5 and 6, a reciprocating grain-pan and a sieve or riddle, and 7 a fan arranged below said pan to deliver a blast to separate the particles of straw and chaff from the grain falling onto the pan from the cylinder and racks.

8 is a beater located, as usual, at the rear of the cylinder and concave.

In carrying my invention into practice I provide racks 9 and 10 located one above the other and between the cylinder and rack or conveyer 4. As shown, the rack 10 is disposed just below the line of the outlet of the concave and a little closer to the cylinder than the rack 9, which is disposed on a line a little below the axis of the cylinder and discharges the straw at a higher point on the delivery straw-rack 4. I also provide a fan-mill or blower 11 below the cylinder and concave and hinged adjustable wind-boards 12 to guide the blast therefrom to the space between the cylinder and concave and the two racks 9 and 10. As shown, the grain-pan 5 and racks 9 and 10 are hung upon pivoted hangers 12', adapting them to swing, respectively, toward and from the fan-mill and toward and from the cylinder and concave. These hangers are carried by adjustable sliding blocks 13, whereby their positions relative to the fan-mill and cylinder may be varied to suit different conditions of service. Fastening devices 14 are provided to hold the blocks fixed in adjusted position.

In operation the threshed straw and grain as they pass from the cylinder are met by the blast or current of air from the blower 11. This blast of air strikes directly under the straw and grain as they pass from the cylinder, and the grain will drop downwardly to the grain-pan 5, while the straw and chaff being the lighter will be blown up onto the racks 9 and 10. Some proportion of the grain necessarily passes with the straw onto the rack, but owing to the mode of delivery will be deposited directly upon the racks and as the latter are reciprocated will be separated from the straw and permitted to drop down on the grain-pan 5, while the straw will be conducted to the delivery-rack 4. By means of the blocks 13 the racks may be adjusted toward and from the cylinder to suit different conditions of service, as when the grain is light or heavy, moist or dry, &c. Thus it will be seen that practically all of the grain threshed out by the cylinder and concave will be directed onto the grain-pan, while the remainder will be threshed out on the racks 9 and 10. By this means the greater proportion of the grain instead of commingling with the straw will be delivered first to a grain-receptacle and the remainder of the grain instead of lying upon the top of the straw will be deposited below the same and directly on the surface of the rack, thus securing its quick separation from the straw and chaff. This enables me to decrease the length of the thresher-frame and to dispense with the complications of devices commonly employed to separate the grain from the straw on the passage of the latter from the cylinder to the wind-stacker chute.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a thresher, the combination with a separator, of an inclined straw-delivery rack, a pair of shaking-racks disposed one above the other and between the separator and delivery-rack, the lower rack being closer to the separator, means for adjusting said straw-racks with relation to the separator, means for delivering a blast of air to blow the straw as it issues from the cylinder onto said racks, and means for catching the grain dropping from the blown straw, substantially as described.

In testimony whereof I have hereunto set my hand in presence of two subscribing witnesses.

FRANK LANDON REEVE.

Witnesses:
L. W. OBERHAUSER,
W. E. HOSMER.